United States Patent [19]

Penn

[11] Patent Number: 5,440,945
[45] Date of Patent: Aug. 15, 1995

[54] HARDGEARED INFINITELY VARIABLE TRANSMISSION

[76] Inventor: Jay P. Penn, 1725 Morgan La., Redondo Beach, Calif. 90278

[21] Appl. No.: 50,558

[22] Filed: Apr. 19, 1993

[51] Int. Cl.⁶ .............................................. F16H 29/08
[52] U.S. Cl. ...................... 74/117; 74/119; 74/121; 74/165; 74/166; 74/437; 74/833
[58] Field of Search ................. 74/116, 117, 118, 119, 74/121, 128, 129, 136, 143, 165, 166, 833, 437; 280/255, 256

[56] References Cited

U.S. PATENT DOCUMENTS

| | | | |
|---|---|---|---|
| 668,172 | 2/1901 | Fischer et al. | 74/119 |
| 881,987 | 3/1908 | Wilber | 74/121 |
| 1,427,541 | 8/1922 | Morton | 74/119 |
| 1,911,156 | 5/1933 | Laing | 74/119 |
| 2,823,550 | 2/1958 | Woldenga | 74/119 |
| 3,078,734 | 2/1963 | Wiig | 74/121 X |
| 4,622,793 | 11/1986 | Oki | 74/833 X |
| 4,693,134 | 9/1987 | Kraus . | |
| 4,854,190 | 8/1989 | Won | 475/216 |
| 4,854,191 | 8/1989 | Nagano | 475/289 |
| 4,864,889 | 9/1989 | Sakakibara et al. | 475/211 |
| 4,909,101 | 3/1990 | Terry, Sr. | 475/16 |
| 4,983,151 | 1/1991 | Pires | 475/170 |

FOREIGN PATENT DOCUMENTS

| | | | |
|---|---|---|---|
| 613573 | 1/1961 | Canada | 74/116 |
| 779688 | 1/1935 | France | 74/119 |

*Primary Examiner*—Allan D. Herrmann

[57] ABSTRACT

A hardgeared infinitely variable transmission (IVT) is provided in which at least one quick return mechanism is hardgeared to the rotating transmission input shaft. The quick return mechanisms convert the rotating motion of the transmission input shaft to a variable motion consisting of a near constant linear velocity portion and a rapid return portion for each cycle of input rotation. The near constant linear velocity portion of the motion of each quick return mechanism is selectively engaged to a conversion device which translates the motion to an output rotation. The input/output speed ratio is adjusted by varying the amount and direction of quick return mechanism motion which is selectively engaged to the conversion device. An infinite range of speed ratios can be produced, as well as output rotation in both forward and reverse directions relative to the input rotation.

29 Claims, 6 Drawing Sheets

HARDGEARED INFINITELY VARIABLE TRANSMISSION

BACKGROUND OF THE INVENTION

1. Field of the Invention

The present invention relates generally to continuously variable transmissions for use in automobiles, trucks, bicycles and other vehicles. More particularly, the present invention relates to a hardgeared continuously variable transmission capable of producing an infinite range of input speed to output speed ratios.

2. Description of Related Art

A transmission is used to convert a rotating input power source, such as that supplied by an automobile engine, to a desired output. The transmission establishes a ratio of input rotational speed to output rotational speed appropriate for a particular operating condition. For example, the transmission can alter the amount of output speed produced by a given input speed, or alter the amount of input speed required to produce a given output speed. In a conventional transmission, the conversion from input to output speed involves switching between a finite number of fixed gear ratios. A user selects one of the fixed gear ratios using a stick shift and clutch, or the switching can occur automatically, as in the case of an automatic transmission. In either case, however, the fixed gear ratios of conventional transmissions are inefficient in that an optimal input/output speed ratio cannot be continuously maintained over varying speed and power requirements. The ratio is restricted to one of the fixed ratios even though the same output speed, for example, could be produced with less input speed and therefore less engine power. This inefficiency means engines must work harder than necessary under many operating conditions, leading to increased engine wear and lower fuel economy.

Continuously variable transmissions (CVTs) address the inefficiency problem in conventional fixed gear ratio transmissions. In a CVT, the input/output speed ratio can be continuously varied to provide optimal ratios within a certain range. Infinitely variable transmissions (IVTs) are CVTs with an infinite speed ratio range, and can therefore provide an optimal speed ratio for all operating conditions. For example, an IVT allows zero output rotational speed with a non-zero rotating input source, and therefore need not disengage the input source to provide a neutral output. Unlike IVTs, CVTs must employ either a clutch mechanism or operate in conjunction with a planetary gear train to provide speed ratios outside the limited CVT speed ratio range.

For many years, manufacturers have attempted to design fuel efficient automobiles incorporating CVTs or IVTs that continuously adjust the speed ratio to maintain the optimal engine speed for a given operating requirement. Despite these efforts, the only commercial implementations currently available are belt driven CVT designs which typically include a continuous flexible belt riding on two pulleys. The speed ratio is varied by adjusting the effective diameter of the pulleys. However, belt driven CVTs such as these cannot accommodate the power requirements of larger vehicles. Their application is therefore limited to small automobiles and light industrial uses. Furthermore, belt driven CVTs suffer from reliability problems. The belts, whether made of rubber, metal or other materials, must be held under high tension to prevent slippage under varying operating conditions. The required high tension leads to excessive wear. U.S. Pat. No. 4,864,889 describes a belt driven CVT that is representative of the current practice.

Other IVT and CVT designs incorporate friction drives utilizing either traction or hydraulic mechanisms, although such systems are not commercially available. U.S. Pat. No. 4,693,134 describes a friction drive IVT designed for motor vehicle applications. This IVT employs traction rollers that contact a variable diameter disk to provide a continuously variable input/output speed ratio. A split torque arrangement is used to reduce the loads placed on the IVT elements. However, friction drive systems are typically unable to provide sufficient torque for large automobiles or relatively heavy industrial uses. In addition, the complexity of friction drive systems prevents their application in lighter weight vehicles such as bicycles. Friction drive IVTs and CVTs also suffer from reliability problems resulting from excessive wear.

Hardgeared designs have been developed in an attempt to overcome the reliability problems associated with belt and friction drive systems. In a hardgeared transmission, the primary means for converting input speed to output speed is hardgeared to the rotating input source. Such designs might also incorporate some form of belt or friction drive as a secondary conversion means not directly driven by the input source. U.S. Pat. No. 4,854,190 describes a hardgeared CVT employing a complex floating planetary gear train controlled by mechanical feedback loops and electrically engaged clutches. U.S. Pat. No. 4,983,151 describes a hardgeared IVT design using planetary gear trains to generate oscillating variable speed motions which are combined into an average output rotation by overriding one way clutches. Adjustment of the oscillating motion is used to control the input/output speed ratio. An infinitely variable ratio is produced by gearing together the oscillation output speed and the input speed, and then subtracting the input speed using a differential gear. Both of these hardgeared designs are highly complex and include a large number of gears and supporting mechanisms, leading to high manufacturing costs, additional reliability problems and limited transmission efficiency.

Friction drive and hardgeared CVT arrangements have also been applied to bicycles, as a replacement for conventional chain and sprocket transmissions. For example, U.S. Pat. No. 4,909,101 describes a bicycle CVT employing a sun gear, a plurality of planetary gears, an overriding clutch and an eccentric system. As the eccentricity is increased, the planetary gear superimposes a pulse drive on the sun gear that exponentially multiplies the drive rotation rate U.S. Pat. No. 4,854,191 describes a speed change mechanism for a bicycle that includes a planetary gear mechanism in which lock pawls are provided to control locking and unlocking of a plurality of sun gears. However, both of these approaches involve considerable manufacturing expense, and lead to weight and efficiency problems over conventional bicycle transmissions. Furthermore, conventionally designed bicycles cannot be easily retrofitted with these CVT designs. Instead, the bicycle must be custom designed to incorporate one of the currently available CVTs.

As is apparent from the above, there presently is a need for a simple, durable and highly efficient IVT that can improve the operating performance of a wide variety of vehicles including but not limited to automobiles, trucks and bicycles. The IVT should provide the reliability and performance advantages of a hardgeared transmission without the additional cost and complexity associated with currently available hardgeared designs. Furthermore, the IVT should be capable of providing sufficient torque to accommodate high power and torque applications, yet be simple enough to also accommodate lightweight low power applications, such as bicycles.

SUMMARY OF THE INVENTION

The present invention provides a hardgeared IVT comprising a transmission input shaft supplying an input drive in the form of repeated strokes; at least one quick return mechanism, each having an input side driven by the transmission input shaft such that an output side of the quick return mechanism moves at a near constant linear velocity for a portion of each stroke of the input shaft, followed by a rapid return to its position at the start of the stroke; a transmission output shaft; means for converting the near constant linear velocity motion of the output side of each quick return mechanism into rotary motion of the transmission output shaft; engagement/disengagement means to engage each quick return mechanism with the conversion means during the near constant linear velocity portion of its output side motion, and disengage the quick return mechanism during the rapid return portion of its output side motion; and speed ratio adjustment means to vary the input/output speed ratio by adjusting the amount of quick return mechanism output side motion which is supplied to the conversion means.

As a feature of the present invention, the quick return mechanisms which comprise the primary means of generating variable output motion from the input drive source are hardgeared to the transmission input shaft in all of the embodiments discussed herein. As a result, the reliability problems associated with belt drive and friction drive designs are eliminated. The hardgeared arrangement of the present invention also permits the IVT to be used in high torque applications not possible with the belt or friction drive designs. Furthermore, the present invention avoids the high cost and complexity of the planetary gear train arrangements used in currently available hardgeared designs.

As an additional feature of the present invention, the IVT provides an infinite range of input/output speed ratios. Thus, the IVT is capable of producing a neutral output drive given a non-zero rotating input drive without disengaging the input shaft from the output shaft. The input/output speed ratio is varied by adjusting the position of a pin securing the output side of each quick return mechanism to the conversion means. Since the magnitude of the quick return mechanism output side motion varies as a function of distance from a pivot point about which the quick return mechanism moves, the pin position relative to the pivot point controls the amount of quick return mechanism output side motion supplied to the conversion means. In all of the embodiments discussed herein the pin position can be adjusted to coincide with the pivot point such that no output side motion is conveyed to the output shaft regardless of the motion of the input side of the quick return mechanism.

In accordance with one aspect of the present invention, the motion of the quick return mechanism about its pivot point is at a near constant linear velocity for a portion of the input stroke, and then returns rapidly to its position before the stroke. Rotational output is obtained by selectively engaging each quick return mechanism to the transmission output shaft for the near constant linear velocity portion of its motion, and disengaging each quick return mechanism during the rapid return portion of the motion. In accordance with one embodiment of the present invention, a continuously driven output is achieved by utilizing two quick return mechanisms positioned 180° out of phase, so that when one quick return mechanism is driving the output, the other is on the return stroke and therefore disengaged from the output.

In accordance with another aspect of the present invention, the IVT may also include means for adjusting the direction of rotation of the transmission output shaft relative to the input shaft. The IVT can thus be used to produce an output drive in both forward and reverse directions. In one embodiment of the present invention, this is accomplished by permitting the pin securing the output side of the quick return mechanism to the conversion means to travel through the pivot point about which the quick return mechanism moves. Reverse speeds result when the pin moves to an opposite side of the pivot point since motion of the quick return mechanism in an opposite direction is thereby supplied to the conversion means.

As a further featured of the present invention, the IVT operating principles disclosed herein can be readily implemented in a variety of relatively simple embodiments. For example, in accordance with one embodiment of the present invention, the quick return mechanisms are hardgeared to the input shaft to provide the primary means for generating variable output motion, but belt or friction mechanisms are used as the secondary conversion means. In another embodiment, an IVT is provided in which both the quick return mechanisms and the conversion means are hardgeared to the input shaft. The two embodiments illustrate the variation which are possible depending upon the needs of a particular application. The IVT principles of the present invention thus provide a simple yet highly versatile means of improving the operating performance of a wide variety of vehicles.

The above-discussed features and attendant advantages of the present invention will become better understood by reference to the following detailed description of the preferred embodiments and the accompanying drawings.

DETAILED DESCRIPTION OF THE PREFERRED EMBODIMENTS

The present invention is based upon the discovery that a simple, inexpensive and highly reliable IVT can be constructed by hardgearing at least one quick return mechanism to a transmission input shaft, and selectively engaging the output side of each quick return mechanism to an output shaft via a conversion means. The position of an adjustable pin securing the output side of the quick return mechanism to the conversion means is adjusted relative to a pivot point about which the quick return mechanism moves to obtain an infinite range of input/output speed ratios, These principals have been applied in developing the preferred embodiments which will be discussed in detail below, It should be understood that the following preferred embodiments are exemplary only, and that other embodiments of the present invention are also possible.

Figure 1:
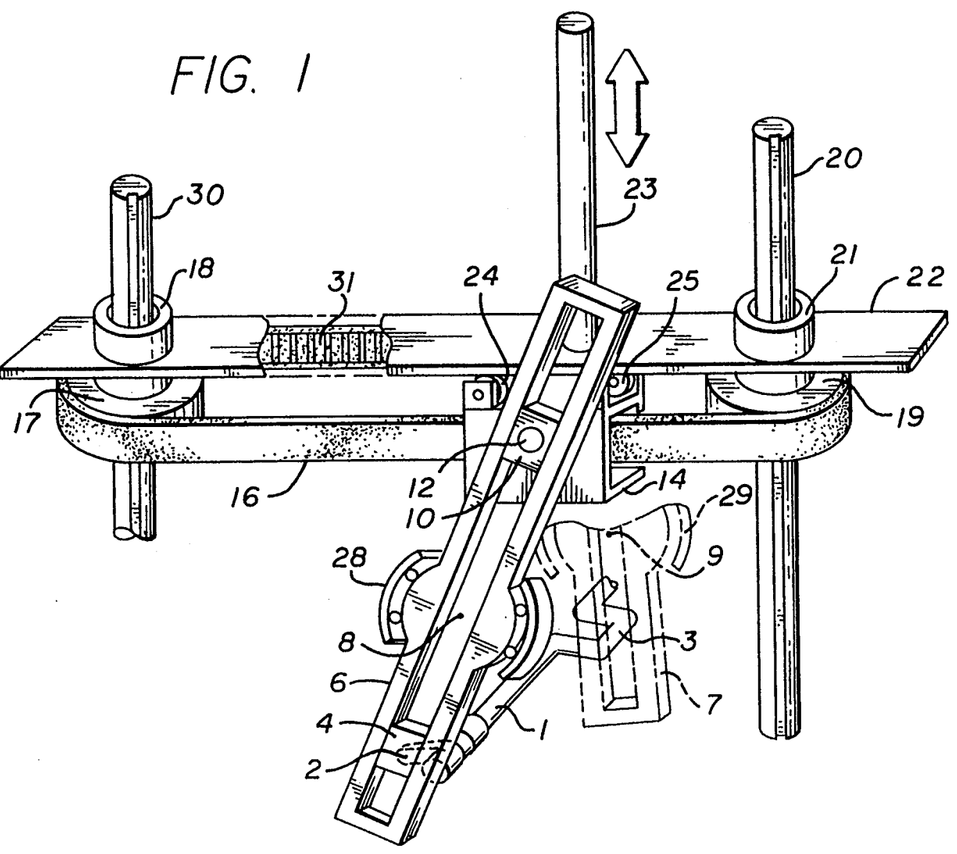
FIG. 1 is a side view of preferred embodiment of the present invention using scillating linkages in the quick return mechanisms.

FIG. 1 illustrates a preferred embodiment of the present invention which uses oscillating linkages in the quick return mechanisms. Transmission input shaft 1 is driven directly from the engine or power source of an automobile, truck or other vehicle, and provides an input drive in the form of repeated strokes. Alternatively, shaft 1 could be driven via a 90° bevel gear or other similar gearing arrangement. The exemplary input shaft 1 has crankarms 2, 3 phased 180° apart. As input shaft 1 rotates, crankarms 2, 3 each drive a separate quick return mechanism. For clarity, only the quick return mechanism driven by crankarm 2 is shown in FIG. 1. An identical quick return mechanism is driven by crankarm 3 and the operation of both will be described below. Crankarm 2 engages and drives slider block 4 as the crankshaft rotates, causing linkages 6, 7 (7 shown in the phantom) to oscillate about imaginary pivot points 8, 9. The axis connecting pivot points 8, 9 runs parallel to input shaft 1. The location of the pivot points 8, 9 are established by the partial bearings 28, 29. The slider block 4 represents the input side of these exemplary quick return mechanisms, and are hardgeared to the input shaft 1.

Figure 15:
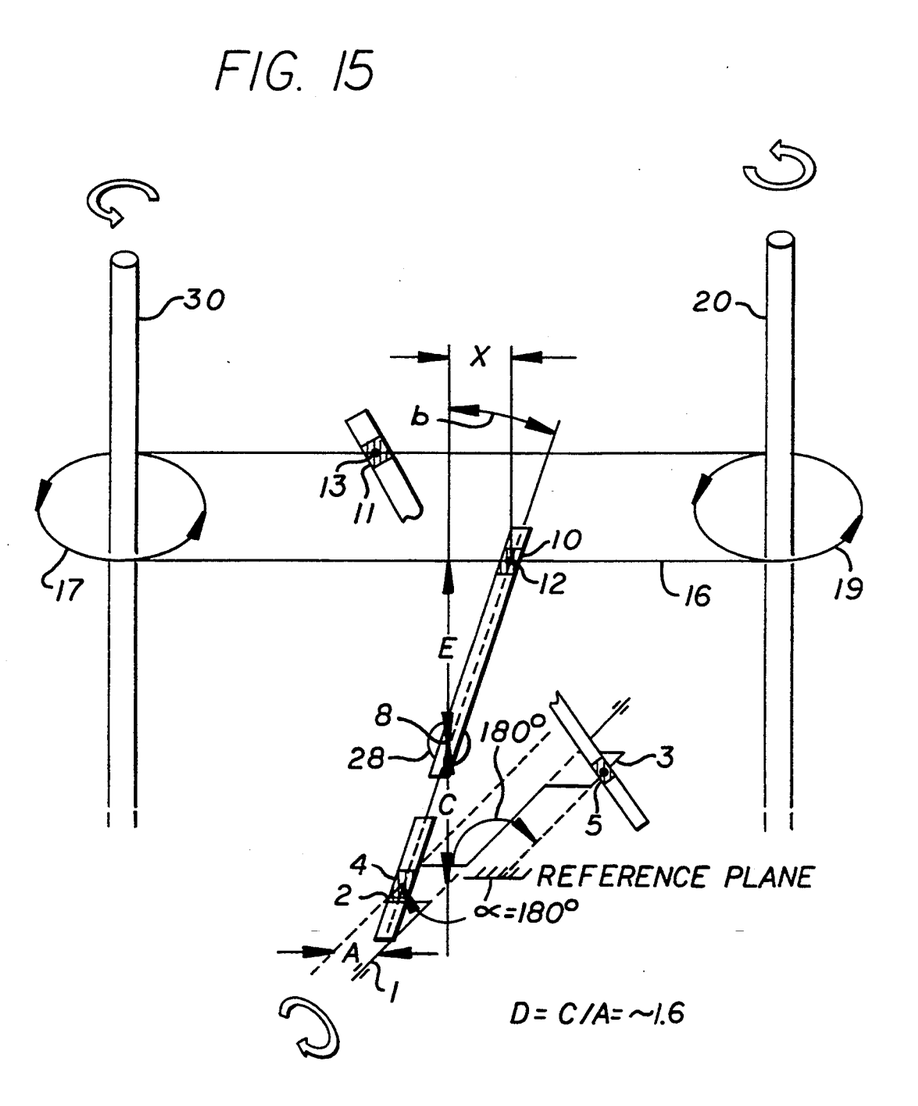
FIG. 15 is a diagram illustrating the movement of the linkages.

Slider 10 is free to slide within linkages 6, 7 through the pivot points 8, 9 for reasons which will be described below. The motion of the slider 10 varies as a function of its position within the linkages 6, 7. The sliders is connected to the linear to rotary conversion input housing 14 via pin 12. Linkages 6, 7 and slider 10 is part of the output side of the quick return mechanisms, while the pin 12 and conversion input housing 14 is part of the conversion means for translating the motion of the output side of the quick return mechanisms to rotation of the output shaft 20. The conversion input housings contain engagement/disengagement means which selectively couple part of the motion of the output side of the quick return mechanisms to the linear to rotary conversion means and thus to output shaft 20. Referring to FIG. 15, the equations which describe the angles b through which linkages 6, 7 rotate about pivot points 8, 9 as they are driven by the transmission input shaft 1, are as follows:

Linkage 6:

$$b_6 = \tan^{-1} \cdot \frac{\sin\alpha}{D - \cos\alpha}$$

Linkage 7:

$$b_7 = \tan^{-1} \cdot \frac{\sin(\alpha + 180)}{D - \cos(\alpha + 180)}$$

In the above equations, $\alpha$ refers to the rotation angle of the input shaft 1, with $\alpha = 180°$ indicating the shaft position shown in FIG. 1, and D refers to the quantity C/A, where C is the distance from the rotational axis of shaft 1 to the pivot point and A is the distance from the axis of shaft 1 to the center axis of the extended portion of crankarms 2, 3. The angle b is referenced to a vertical line perpendicular to the rotational axis of input shaft 1 and drawn upward through the pivot point for the appropriate linkage. Thus a value of $b = 0°$ results when the center of the slider lock falls on this vertical line. In the preferred embodiment of FIG. 1, D is set to about 1.6 to provide a fairly constant output speed throughout the input stroke, although other values of D between about 1.4 and 1.8 could also be used.

Both linkages 6 and 7 have a constant velocity portion of the stroke equal in time duration to that required for 180° of crankshaft 1 rotation. This is followed by an equal duration return stroke.

Since the two linkages are phased 180° apart, one linkage is always traveling at near constant velocity and carrying the load to the transmission output. Handovers of loads from linkages 6 to 7 and vice versa occur at positions of $\alpha =$ approximately 90° and 270°.

For values of $\alpha$ from about 90° to 270° the motion imparted on the slider 10, pin 12 and conversion input housing 14 by the oscillating linkage 6 is of near constant velocity with respect to the rotational speed of the input shaft 1, in that the velocity varies less than about 5% during this portion of he input stroke. Similarly, for values of $\alpha$ from about 270° to 90° the motion imparted on an associated slider, pin, and conversion input housing of linkage 7 are also of near constant velocity. If the vertical distances between pin 12 and the associated pin of linkage 7 and pivot points 8 and 9, respectively, are identical, the two near constant velocity segments will have the same magnitude. This distance is defined as E. By adjusting the distance E, the magnitude of the near constant linear velocity of the sliders, pins and conversion input housings can be varied relative to the rotational speed of the input shaft. The distance E therefore determines the input/output speed ratio of the IVT, as will be discussed further below. The equations which describe the near constant linear velocity motion of pin 12 and the associated pin of linkage 7 and thus the output sides of the quick return mechanisms to which they are connected, are as follows:

Pin 12 motion:

$$X = \frac{\sin\alpha}{D - \cos\alpha} \times E$$

Motion of the associated pin of linkage 7

$$X = \frac{\sin(\alpha + 180)}{D - \cos(\alpha + 180)} \times E$$

In the above equations, X is defined as the lateral distance travelled by the respective pins in a plane perpendicular to the rotational axis of the input shaft. The distance is measured relative to the rotational axis of the input shaft, with a value of X=0 corresponding to a pin positioned on a vertical line perpendicular to the rotational axis of shaft 1 drawn from that axis upward through the pivot point. These equations show that the distance traveled by the sliders, pins and conversion input housings during an input stroke, and therefore the amount of the quick return mechanism output side motion coupled to the transmission output, is a function of the distance E.

Figure 2:
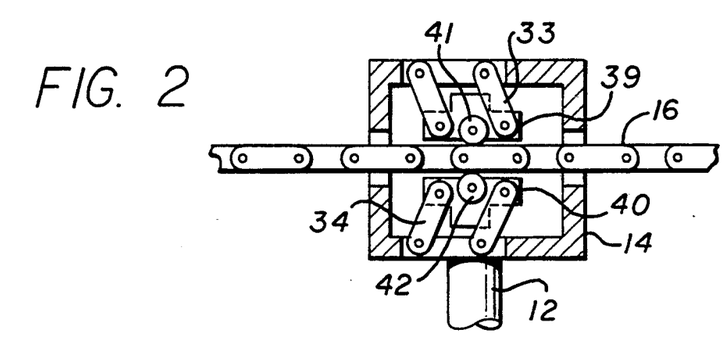
FIGS. 2, 3, and 4 illustrate exemplary engagement/disengagement means for use in the preferred embodiment of FIG. 1.
Figure 3:
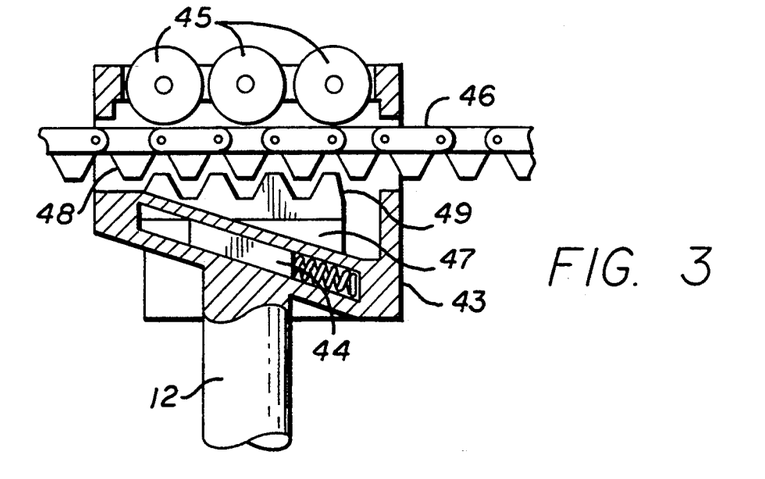
Figure 4:
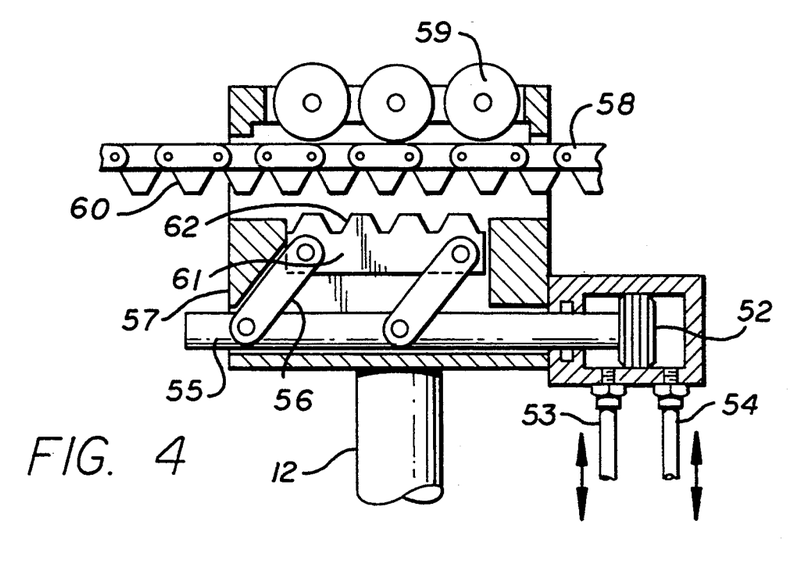

The above described lateral motion of pin 12 and the associated pin of linkage 7 selectively coupled to the output shaft 20 such that each pin drives the output shaft for the near constant linear velocity portion of each complete stroke cycle. In the preferred embodiment of FIG. 1, this coupling is accomplished in the following manner. Pin 12 secures slider 10 to conversion input housing 14 containing engagement/disengagement means, exemplary embodiments of which are shown in FIGS. 2 through 4. The engagement/disengagement means act to engage the motion of the pins and the interface housings to a belt 16 for the linear portion of the stroke, and disengage the motion at all other times. Alternatively, a chain 31 or other type of endless flexible member could be used in place of belt 16. The belt should have teeth or other means suitable for engaging the sprockets 17, 19. A belt can be used in this portion of the IVT since the belt will not be subject to the full tension and load variation experienced by the hardgeared oscillating linkages which generate the variable motion, and serves only to convert the variable motion to a rotating output.

As a result of the selective engagement described above, a near constant linear velocity drive is imparted to the belt 16 as shaft 1 rotates. The oscillating linkage motion which produces this near constant drive will now be described. During a typical input rotational stroke linkage members 6 and 7 oscillate over values of b from about −39° to +39° for a value of D of about 1.6. The exact values of these oscillation angles depend upon the particular dimensions chosen for the variable D. With D set to about 1.6, the near constant velocity portion of each stroke begins at a value of b of about −32° and continues until about +32°, during which changes from about 90° to 270° for linkage 6 and about 270° to 90° for linkage 7. The rapid return stroke begins at a value of b of about 32° and lasts until b arrives at −32°. For values of b between about +32° to +39° the linkages decelerate from near constant velocity to rest. From +39° to −39° the linkages travel at an average velocity that is considerably higher and in the opposite direction compared to the constant velocity portion of the stroke. Linkages 6 and 7 come to rest at about b=−39° where they begin to accelerate to near constant velocity At about b=−32°, the linkages have achieved near constant velocity, after which the input stroke cycle repeats. Since the non-linear rapid return portion of the stroke requires 180° of shaft 1 rotation, and crankarms 2 and 3 are 180° out of phase, near continuous power is applied to the output shaft 20 during the entire input stroke. Linkages 6 and 7 alternate driving the output shaft 20 every 180° of input shaft 1 travel.

In the embodiment of FIG. 1, belt 16 drives sprockets 17 and 19 which are supported by bearings 18 and 21. Mirror image bearings (not shown) are located under and hidden by sprockets 17, 19. Bearings 18 and 21 and the lower bearings are mounted to platform 22. Sprocket 19 is keyed to and drives transmission output shaft 20, while sprocket 17 rotates freely around shaft 30. Alternatively, sprocket 17 could be keyed to shaft 30, with shafts 20 and 30 serving as interim output shafts, which would then be geared together to drive a single output drive shaft. In the present embodiment, sprockets 17 and 19 and belt 16 are free to move up or down shafts 20, 30 except as constrained in the vertical direction by platform 22 and conversion input housing 14. Platform 22 also constrains the motion of rollers 24, 25 mounted to conversion input housing 14. The vertical position of platform 22 is controlled by the position of vertical shaft 23. Lowering shaft 23 will also lower conversion input housing 14, sprockets 17, 19, belt 16 and the position of slider 10 within linkage 6. Adjusting the position of vertical shaft 23 therefore effects the distance E and thus the distance traveled by pin 12 during the near constant linear velocity portion of the stroke for values of b from about −32° to +32°. Since this linear velocity is converted to rotational output speed by belt 16 and sprocket 19 the position of shaft 23 controls the input/output speed ratio.

The input/output speed ratio is adjusted as follows. When shaft 23 is in its most upward position, interface housing 14 and pin 12 is at maximum distance from pivots 8, 9. Distance E will therefore be at its maximum value, and thug the linear velocity and distance traveled by the pins and conversion input housings during each 180° rotation of the input shaft will be at maximum value as will the rotational speed of the output shaft 20. At this point the largest amount of output speed is produced for a given input speed. As shaft 23 lowers platform 22 toward pivot points 8, 9, the distance E will be reduced, thereby reducing the linear velocity of the pins and conversion input housings, and the rotational speed of output shaft 20. The input/output speed ratio is therefore decreased assuming a constant input speed.

The partial bearings 28, 29 permit pin 12 to pass through the pivot points 8, 9 as shaft 23 lowers platform 22. As a result, the embodiment shown in FIG. 1 provides a simple means of achieving neutral and reverse outputs. When shaft 23 is lowered to the position where pin 12 are aligned with the axis connecting imaginary pivots points 8, 9, no output shaft rotation will be produced, even though the input shaft is still rotating. The IVT can thus produce a neutral output without completely disengaging the rotating input from the output shaft. An alternative means of providing a neutral output is to simultaneously disengage conversion input housing 14 from belt 16.

The output shaft can be made to rotate in the reverse direction by positioning shaft 23 and platform 22 such that pin 12 is below pivot points 8, 9. When utilized in conjunction with the engagement/disengagement means of FIG. 4, this arrangement causes the belt 16 to move in a direction opposite to that moved when pin 12 is above the pivot points 8, 9. The input/output speed ratio in the reverse direction is determined by the distance E of pin 12 below pivot points 8, 9. The embodiment of FIG. 1 could also include a control means using servo/stepper motor position feedback and electrically or mechanically controlled stops to prevent inadvertent shifts into reverse.

The preferred embodiment of FIG. 1 uses two quick return mechanisms in the form of oscillating linkages 6, 7 with each linkage engaging the output shaft for portions of alternating 180° periods of input stroke rotation. Alternative embodiments may also be constructed with more than two quick return mechanisms in order to increase the time allotted for the return stroke, and thereby decrease the acceleration loads on each quick return mechanism accordingly. For example, an alternative embodiment including three quick return mechanisms would be similar to the transmission of FIG. 1, with the third oscillating linkage and conversion input housing located on the inside of belt 16. Conversion input housing 14 would be modified to occupy only the space on the outside of the belt 16 to allow room for the additional conversion input housing. The input shaft would include three crankarms phased 120° apart, each driving one of the oscillating linkages. An alternative embodiment utilizing a single quick return mechanism could also be constructed to further reduce manufacturing cost and complexity. In such an embodiment, the input shaft would engage the output shaft for only a portion of one 180° period of the input stroke, and would coast during the remainder of the stroke. Energy storage devices such as springs or flywheels could be used to store the energy input during the driving portion to be recovered during the unpowered coast portion of the stroke.

Further variations n the embodiment shown in FIG. 1 are possible. For example, conversion input housing 14 could be eliminated, and the single belt 16 replaced by two belts, each one continuously engaged to one of the oscillating linkages via a slider which is free to move within the linkage as in FIG. 1. Alternatively, a three belt arrangement could be used with the middle belt secured to a bracket. The bracket contains a centrally (by width) mounted pin which is also fastened to one of the two oscillating linkages. In a similar manner the upper and lower belt would be secured to a second bracket common to and centered between both belts. The second bracket contains a centrally mounted pin which is fastened to the alternate linkage. The three belt arrangement is used to minimize out of plane forces exerted on the belt. A modified oscillating linkage could also be used, in which each linkage is replaced by a set of two linkages which are secured together at their lower end and open on facing sides such that a slider can move upward or downward between them. Instead of being directly driven by a crankarm as in the FIG. 1 embodiment, each crankarm could drive a gear set which engages a shaft attached to the oscillating linkage set. The slider for a particular set of linkages is tied to thee belt or belts driven by that set of linkages, while the other belt is free to move through the slider. For example, in the three belt arrangement, the middle belt could be secured to the slider free to move between the facing sides of the first set of linkages, while the upper and lower belts could be tied to the slider moving within the second set of linkages. The belts secured to the sliders will thus pass through the two facing linkages which make up each set of linkages. Sprockets are driven by each belt in the oscillating rotary motion of the linkage set to which the belt or pair of belts is secured. A clutch mechanism controlled by the input shaft position alternately engages one of the sprockets with the output shaft during the period in which the rotational speed of that sprocket is relatively constant. The clutch mechanism serves to convert the oscillating motion of the belt and corresponding rotation of the sprockets to a near constant rotation in one direction. Alternatively, the clutch could employ plates with gear teeth which engage each other when the rotational rates of the sprockets are near constant. This arrangement is practical because the difference in the velocities of the sprockets and output shaft is negligible at the time of engagement.

In yet another variation the sprockets would contain sprags which act as one-way overriding clutches such that only the near constant rotary motion is imparted to the output shaft.

The engagement/disengagement means contained within the conversion input housing 14 of FIG. 1 will now be described. In each of the embodiments only a single conversion input housing will be discussed, with the understanding that the same hardware and operation will apply to each conversion input housing in the particular IVT. FIG. 2 shows one embodiment which uses friction pads to engage belt 16 during the appropriate portion of the input stroke. Referring now to FIG. 2, whenever pin 12 and therefore conversion input housing 14 begins to travel faster than belt 16, friction pads 39, 40 will grasp the belt 16 and translate the motion of pin 12 and conversion input housing 14 to motion of belt 16. Whenever the velocity of the belt 16 begins to exceed the velocity of pin 12 and housing 14, the belt 16 will become disengaged and roll freely on spring loaded rollers 41 42. The friction pads and rollers are held in place by upper and lower support elements 33, 34.

A second alternative engagement/disengagement means is shown in FIG. 3. In this embodiment, pin 12 is secured to a modified conversion input housing 43. Chain 46 replaces belt 16 in the preferred implementation, although a belt could also be used. Whenever the velocity of pin 12 and conversion input housing 43 begins to exceed that of chain 46, rack 47 is pushed upward by the spring and damper mechanism 44 of housing 43, thus forcing an engagement between the teeth 48 of chain 46 and teeth 49 of rack 47. Whenever the velocity of chain 46 exceeds the velocity of pin 12 and housing 43, rack 47 is forced to lower and disengage the chain 46. Spring and damper mechanism 44 controls the force and speed of the recoil of rack 47. Rollers 45 are used to limit undesired motion of the chain as it passes through housing 43.

FIG. 4 shows a third alternative engagement/disengagement means. In this embodiment, chain 58 is preferred, although a belt could also be used. The engagement of rack 61 with chain 58 is controlled by a the relative velocities of pin 12 and modified conversion input housing 57, as well as the position of and force applied to piston 52 via fluid orifices 53, 54. The relative velocities operate to raise or lower rack 61 in much the same manner as the embodiment of FIG. 2. As in FIG. 3 the rollers 59 limit undesired chain movement. Further engagement control is provided by piston 52, which is connected to rack 61 through a rod 55 via support elements 56. Movement of piston 52 acts to raise or lower rack 61 such that its teeth 62 will engage the teeth 60 of chain 58. A hydraulic system driven by the transmission input shaft provides pressurized fluid to piston 52 via fluid orifices 53, 54. Since the transmission input shaft controls the pressure applied to piston 52 as well as the oscillating motion of pin 12, the hydraulic system can be designed such that the piston 52 acts to engage rack 61 to chain 58 only during the near constant linear velocity portion of the oscillating motion. As described above with respect to FIG. 1, this would provide forward speeds when pin 12 is above pivot point 8 and reverse speeds when pin 12 is below the pivot point 8. System pressures and hydraulic forces can be manually or automatically adjusted so that they are best tailored to a particular operating condition. Automatic control could be based on output shaft torque or other parameters.

The foregoing discussion has been directed to the basic preferred embodiment of FIG. 1 incorporating hardgeared oscillating linkages in the quick return mechanisms and a belt or chain to convert the variable oscillating motion to output rotation, and variations thereon. A second preferred embodiment, in which the quick return mechanisms and the means of converting the variable oscillation to output rotation are both hardgeared, will now be described.

Figure 5:
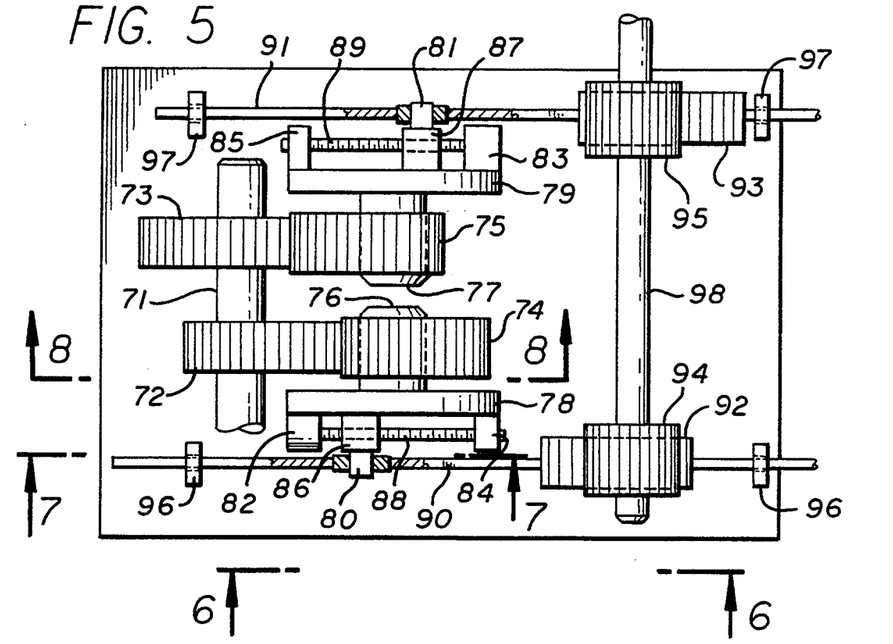
FIG. 5 is a top view of a second preferred embodiment of the present invention using single lobe elliptical gears and sliding links in the quick return mechanisms.

FIG. 5 illustrates a top view of the second preferred embodiment of the present invention. This embodiment also employs quick return mechanisms to produce a near constant linear velocity motion for a portion of the input stroke, a means to convert the linear motion into a rotary output, a means to selectively engage and disengage the quick return mechanism from he output shaft, and a means to adjust the input/output speed ratio by varying the amount of quick return mechanism output side motion supplied to the conversion means. In this embodiment, however, elliptical gears and sliding links are used in the quick return mechanisms. Although the arrangement shown employs two quick return mechanisms arranged 180° out of phase, this is by way of example only. The embodiment of FIG. 5 can be also be implemented with a single quick return mechanism or three or more appropriately phased quick return mechanisms.

The operation of the exemplary embodiment shown in FIG. 5 is as follows. Transmission input shaft 71 has elliptical gears 72, 73 mounted on it with the shortest radii of each elliptical gear phased 180° apart with respect to the other gear. Elliptical gears 72, 73 mate with matching gears 74, 75 which drive shafts 76, 77, respectively. Disks 78, 79 are centered on and secured to shafts 76, 77 respectively. The input rotational motion of shaft 71 is therefore translated to a rotating motion of disks 78, 79 which exhibits a near constant linear velocity for a portion of the input stroke. Disks 78, 79 engage slider housings 90, 91 engage via nuts 86, 87, slider blocks 80, 81 and pin 102 respectively. The motion of pin 102 as a result of rotation of disks 78, 79 is thus imparted to slider housings 90, 91. The slider housings 90, 91 engage sprockets 94, 95 via racks 92, 93. A portion of the motion of the slider housings is imparted to the sprockets 94, 95 which engage and rotate the output shaft 98 as will be discussed in further detail below.

Figure 7:
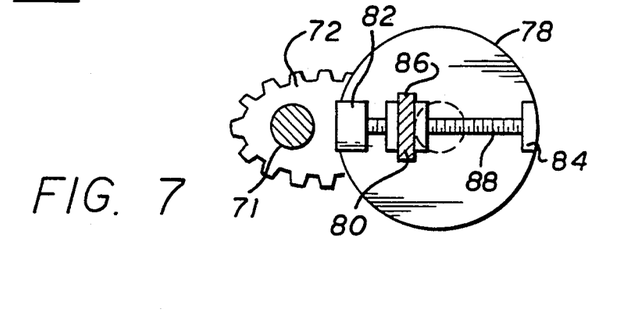
Figure 8:
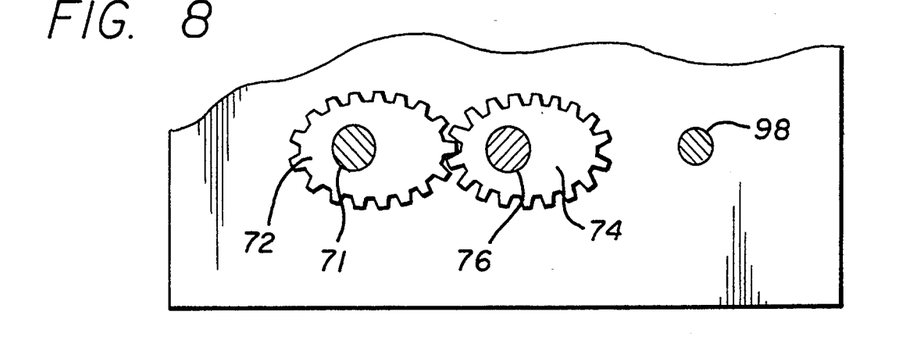

Motors 82, 83 secured to disks 78, 79 drive shafts 88, 89 which, other than for rotation, are constrained by bearings 84, 85. These elements can be seen in greater detail in the sectional view of FIG. 7. Since these elements are secured to the surface of the disks, they rotate along with the disks. Slider blocks 80, 81 are free to rotate about pin 102 and a pin associated with block 81 such that they remain upright within slider housings 90, 91 as the pins move about the centerline of shafts 76, 77. To vary the transmission input/output speed ratio, motors 82, 83 rotate shafts 88, 89 causing movement of nuts 86, 87 relative to the centerline of their respective disks 78, 79. Since pins 102, 103 are mounted to nuts 86, 87, movement of the nuts by the motors will also affect the distance traveled by pins 102, 103 as they rotate about the centerline of their respective disks. The variable motion that shafts 76, 77 impart on pin 102 establishes a near constant linear velocity motion on slide housings 90, 91, respectively for a portion of each 180° rotation of input shaft 71.

Figure 6:
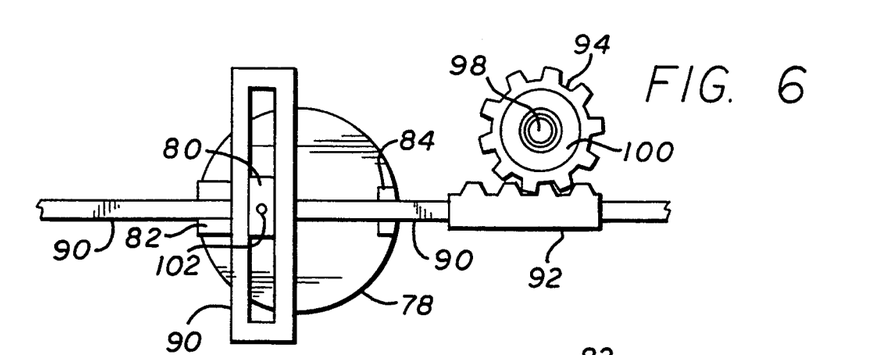
FIGS. 6, 7, and 8 are three frontal sectional views of the second preferred embodiment of FIG. 5.

Referring now to FIG. 6, during the second 180° of the rotation period of shaft 1, the velocity of pin 102, slider housing 90, and rack 92 decelerate to rest, rapidly return to begin the next stroke and then accelerate back up to near constant linear velocity. For a portion of this period, the symmetric set of hardware driven 180° out of phase on shaft 71 moves an associated pin slider housing 91 and rack 93 in a constant linear motion. Racks 92, 93 engage sprockets 94, 95 respectively for the near constant linear portion of the pin, slider housing and rack motion, which occurs on different 180° portions of the input stroke cycle. Sprockets 94, 95 contain sprag 100 which act as overriding one-way clutches, such that only the near constant linear velocity portion of the rack motion is imparted to the output shaft 98. The sprags thus alternately engage and disengage their respective sprockets from the output shaft about every 180° of input shaft 71 rotation, resulting in a continuous drive supplied to output shaft 98. To assure equal output speeds during both 180° portions of a stroke of input shaft 1, the distance of pin 102 from the centerlines of shafts 76, 77 should be set to an equivalent value by motors 82, 83. Various methods can be employed to accomplish this task including the use of stepper or servo motors, position feedback control, or direct mechanical linkage between pin 102.

As discussed above, adjusting the position of pin 102 relative to the centerline of shafts 76, 77 results in changing the magnitude of the velocity and distance traveled by racks 92, 93. Since these racks alternately drive output shaft 30, varying the position of pin 102 permits am infinitely variable input/output speed ratio. By positioning the pin 102 at the center of disks 78, 79 and shafts 76, 77, no output shaft rotation will be produced regardless of the rotational speed of the input shaft 71. This embodiment of the IVT can thus produce a neutral output without disengaging the input shaft from the output shaft.

In order to produce output rotation in reverse directions for this embodiment, the positions of pins 102, 103 should be shifted by 180° relative to the centerlines of shafts 76, 77. For example, to produce output motion in a direction opposite to that produced by the arrangement illustrated in FIG. 5, the positions of the pin 102 slider blocks 80, 81 and nuts 86, 87 on shafts 88, 89 should be reversed relative to the center of their respective disks. Other embodiments for achieving reverse speeds include mechanically substituting a second set of sprockets with sprags that allow motion in a direction opposite to that of sprag 100. Either set of sprockets should be capable of engaging the output shaft to produce rotation in a desired direction. Alternatively, the motion of output shaft 98 and the motion of input shaft 71 could be combined as inputs to a planetary gear arrangement, and planetary gear ratios could be selected to permit reverse speeds for some rotational speeds of output shaft 98.

Alternate engagement/disengagement means can also be used in place of the sprags 100, 101 in the embodiment of FIG. 5. One possible variation (not shown) involves securing sprockets 94, 95 directly to output shaft 98. Slider housings 90, 91 are modified to permit movement of racks 92, 93 in the vertical as well as the horizontal direction. In this variation, the engagement-/disengagement function previously performed by sprags 100, 101 is now performed by controlling the vertical position of racks 92, 93. Rack 92 is raised and therefore engages sprocket 94 during the first approximately 180° of shaft 71 rotation and rack 93 is raised and therefore engages sprocket 95 during the next 180° of shaft 71 rotation. When one rack is raised, the other is lowered and therefore disengaged from its sprocket. A variety of mechanical, hydraulic, and electromechanical devices can be employed to control the vertical position of the racks based on the position of shaft 71.

Figure 9:
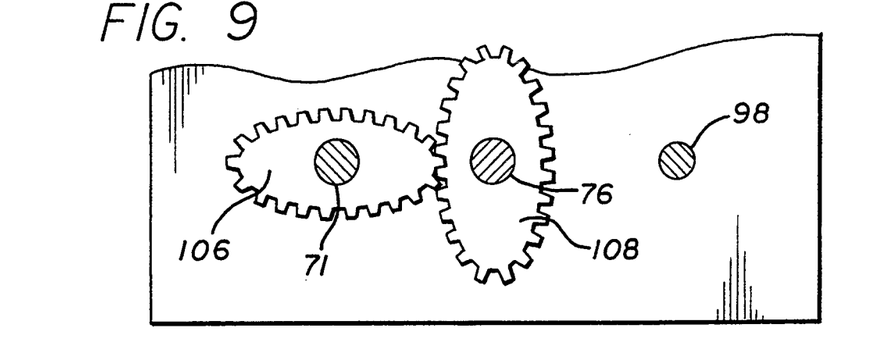
FIG. 9 is a frontal sectional view of a variation of the embodiment of FIG. 5 using bi-lobe elliptical gears as an alternative to single lobe elliptical gears.

The embodiment of FIG. 5 discussed above uses single lobe elliptical gears o produce a near constant linear velocity for each of the quick return mechanisms on alternating 180° segments of each input stroke. Alternatively, the embodiment can employ the bi-lobe elliptical gears shown in FIG. 9. Each quick return mechanism includes a pair of bi-lobe gears 106, 108 driven by input shaft 71 to produce the following quick return mechanism motion over a 360° input stroke cycle: near constant linear velocity in one direction for 90°; a 90° reversing; near constant velocity in the opposite direction for 90°; and a second 90° reversing to complete the 360° cycle. This arrangements can provide smoother transmission of power from input to output, especially in a single quick return mechanism embodiment. In the dual quick return mechanism embodiment of FIG. 5, one set of bi-lobe gears will drive shaft 76, and another set will drive shaft 77, replacing the two sets of single lobe elliptical gears 72, 74 and 73, 75.

Figure 10:
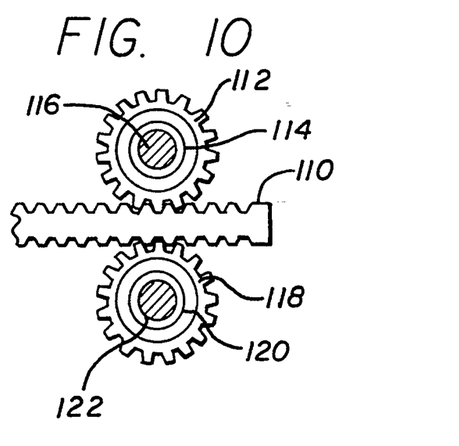
FIG. 10 is a frontal sectional view of a variation of the embodiment of FIG. 5 using sprags as an alternative engagement/disengagement means.

The modified rack and sprocket arrangement shown in FIG. 10 can accommodate the quick return mechanism motion produced by the bi-lobe elliptical gears. In this arrangement rack 110 replaces rack 93 of FIG. 5 and continually engages both sprockets 112 and 118. Sprockets 112, 118 alternately engage sprags 114, 120 for 90° periods of rotation of input shaft 71. The sprockets 112, 118 drive interim shafts 116, 122 respectively. Interim shafts 116, 122 are preferably geared together to drive a centrally positioned output shaft (not shown). In the case of dual quick return mechanisms, a second modified rack and sprocket arrangement is driven 90° out of phase with the first. Continuous rotational power is applied to the output shaft during each of the four 90° driving phases, with each quick return mechanism driving the output shaft for alternating 90° periods.

Figure 11:
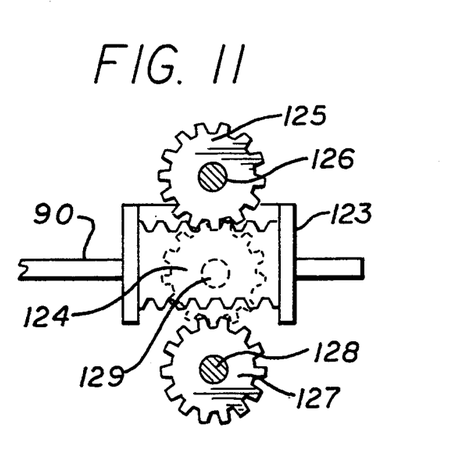
FIG. 11 is a frontal sectional view of a variation of the embodiment of FIG. 5 using a vertically movable rack as an alternative engagement/disengagement means.

An alternative engagement/disengagement means suitable for use with the bi-lobe elliptical gear motion is shown in FIG. 11. Modified rack 123 is driven by slider housing 90 of FIG. 5. Sprockets 125, 127 are mounted on and secured directly to interim output shafts 126, 128, and do not include sprags. Rack 123 is lowered to engage sprocket 127 during the first 90° of near constant velocity motion in one direction. After a 90° reversing motion rack 123 is raised to engage sprocket 125 during the second 90° of near constant velocity motion in the opposite direction. As a result both sprockets 125, 127 produce rotation of their respective interim output shafts in the same direction, but for different portions of the input stroke. The interim shafts 126, 128 are geared together via gear 124 to drive a centrally positioned final output shaft 129. As described in connection with alternate engagement/disengagement means for use with the single lobe embodiment of FIG. 5, hydraulic, mechanical, or electromechanical devices can be employed to raise or lower the racks, thereby causing them to engage or disengage from sprockets 125, 127 as a function of the input shaft 71 rotation.

The embodiments of FIGS. 1 and 5 are suitable for use in a wide variety of vehicular applications including but not limited to automobiles, trucks, motorcycles and bicycles. Variations may be made as necessary to accommodate a particular application without deviating from the scope of the present invention. For example, certain modifications may be appropriate for bicycle applications, which are typically lightweight, lower torque and do not require reverse speed capability.

Figures 12, 13, 14:
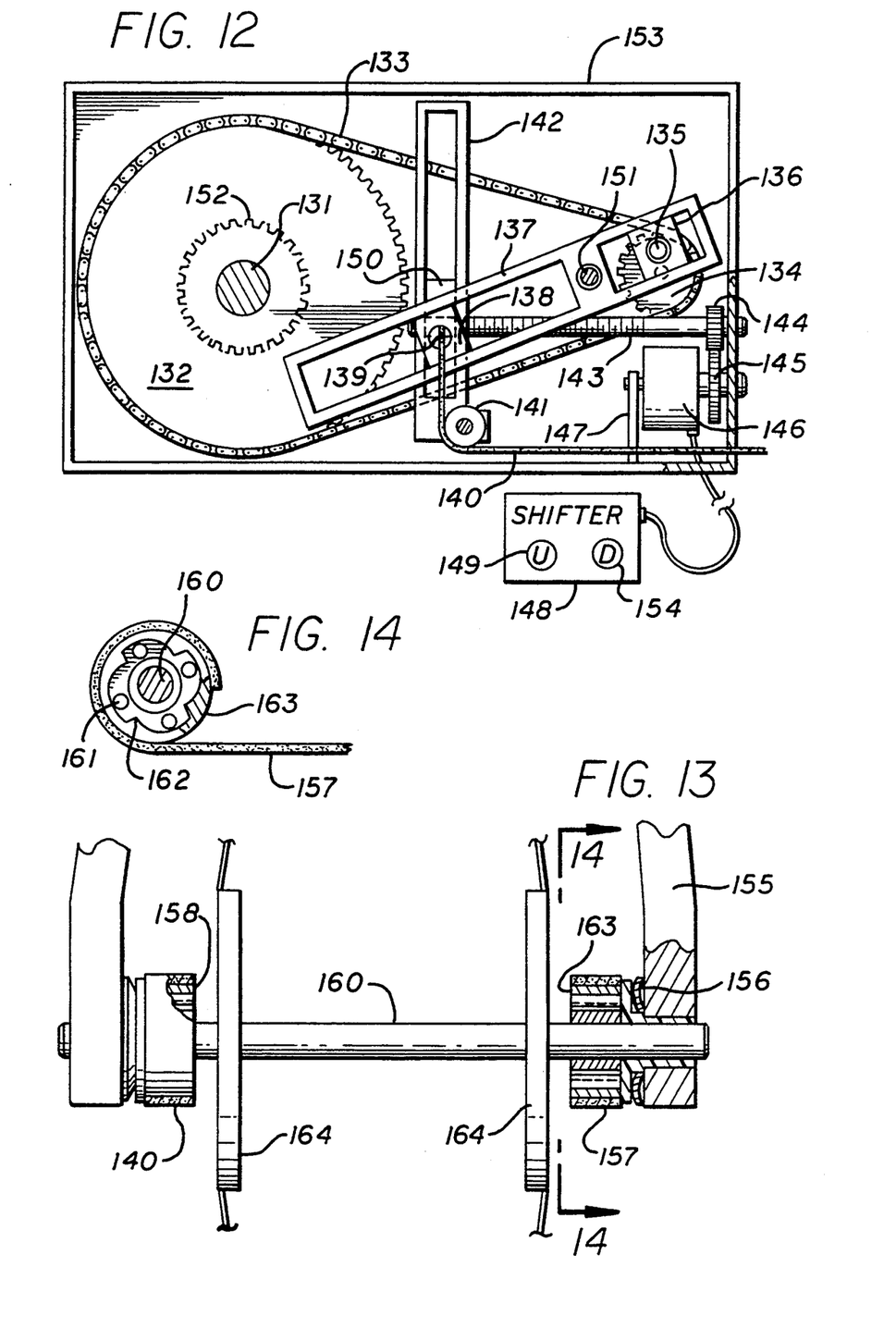
FIG. 12 shows the preferred embodiment of FIG. 1 adapted for use in a bicycle application.
FIG. 13 is a forward looking view of the rear portion of a bicycle incorporating the embodiment of FIG. 12.
FIG. 14 is a side sectional view of one of the sprags used in the embodiment of FIG. 12.

FIG. 12 shows a preferred embodiment of an oscillating linkage IVT similar to those described in conjunction with FIG. 1 but adapted for use in a bicycle application. In a bicycle designed specifically for use with this IVT, shaft 131 could connect the left and right pedals of the bicycle. Housing 153 would replace the typical pedal crank mechanism. Alternatively, in an after market application, the original factory-installed bicycle chain and front sprocket (both not shown) could drive sprocket 152 and thereby shaft 131. Housing 153 could be mounted to the frame of the bicycle preferably between the pedal crank mechanism and the rear wheel attach fitting (both not shown).

The exemplary embodiment shown in FIG. 12 operates as follows. Shaft 131 is secured to and drives sprocket 132 and chain 133, which in turn drives sprocket 134. Crankarm 135 is mounted on sprocket 134 and an identical second crankarm (not shown) is positioned 180° out of phase with crankarm 135 on the other side of sprocket 134. Crankarm 135 provides input motion to the one exemplary quick return mechanism shown. The second crankarm on the other side of sprocket 134 provides input motion to a second quick return mechanism (not shown). The quick return mechanism shown consists of slider block 136, oscillating linkage 137, pivot 151, slider 138 and pin 139. The operation and motion of these elements is as described in conjunction with FIG. 1. Belt 140 is fastened to pin 139 and its motion is also constrained by roller 141 mounted to slider housing 153. Rotating shaft 143 is threaded through and adjusts the horizontal position of slider housing 142. The motion of pin 139 is constrained both by oscillating linkage 137 and by slider 150. Adjusting the horizontal position of slider housing 142 by rotating shaft 143 will therefore change the velocity and distance traveled by pin 139 and belt 140 during each input stroke. An identical set of hardware (not shown) is mounted on the other side of sprocket 134.

In the preferred embodiment of FIG. 12, shaft 143 is rotated by gear 144 to adjust the position of slider housing 142. Gear 144 is driven by gear 145 which is mounted to motor 146. Bracket 147 mounted to housing 153 holds the motor 146 in place. The same motor could also drive a second gear and shaft (not shown) to adjust the position of the identical slider housing on the opposite side of sprocket 134. An electric motor control 148 including momentary switches 149, 154 is suitably mounted for easy user access, preferably on the bicycle handle bar. Electrical power is supplied to the motor and control switches via a battery and/or generator. Pushing the momentary electric "up" switch 149 causes motor 146 to turn gears 145, 144 and shaft 143 in a direction such that slider housing 142 moves away from pivot 151, thereby increasing the velocity and distance of pin 139 and belt 140 travel during a given input stroke and thus the input/output speed ratio. Conversely, pushing the momentary "down" switch 154 drives the motor in the opposite direction, moving pin 139 closer to pivot 151 and decreasing the input/output speed ratio. Since reverse speeds are not necessary for this bicycle application, the oscillating linkage need not permit movement of slider 138 containing pin 139 through pivot 151. In this embodiment, pivot 151 is fixed to the bicycle frame or housing 153, and the partial bearing which permitted motion through the pivot point in FIG. 1 is not needed.

FIG. 13 shows the rear frame 155 of a bicycle propelled by the IVT of FIG. 12. The rear wheel 164 is secured to an output shaft 160 which is propelled by belt 140 on the left and an identical belt 157 on the right via sprags 158, 163 respectively. Belt 157 and sprag 163 on the right are driven by the second quick return mechanism and related hardware which omitted from FIG. 12. Each of the sprags 158, 163 include clutch mechanisms which permit only one direction of sprag rotation to be translated to rotation of output shaft 160. FIG. 14 is a detailed side sectional view of sprag 163 showing clutch mechanisms 161, 162. Belt 157 is pulled forward at near constant velocity and engages sprag 163 on alternating 180° periods of sprocket 134 rotation. A recoil spring 156 is located between the bicycle frame 155 and the sprag 163. During the forward stroke of belt 157 the rotating motion of sprag 163 compresses and loads the recoil spring 156. During the return stroke the recoil spring 156 unloads and causes the belt 157 to retract around the sprag 163. An identical recoil spring (not shown) is located between sprag 158 and the opposite side of bicycle frame 155. When recoil spring 156 is unloading, the recoil spring on the opposite side is being compressed by rotation of sprag 158 resulting from the motion of belt 140. The left and right mounted sprags 158, 163 thus propel the rear wheel of the bicycle for alternating 180° periods of input stroke rotation.

The embodiment of FIG. 12 can be readily modified for automatic control of input/output speed ratio using a microprocessor based system. The bicyclist would indicate a desired level of pedaling effort in terms of rpm or other suitable parameter by adjusting momentary increment/decrement switches 149, 154 while monitoring an LCD or other suitable display of key parameters. The microprocessor within motor control 148 uses this information, along with transducer output signals indicating current wheel and pedal speed, to control the position of the slider housing 142 via motor 146 as described above.

In an alternative embodiment, the IVT of FIG. 12 may be simplified by using a mechanical means to adjust the input/output speed ratio. The control motor 146, associated gearing 144, 145 and rotating shaft 143 could be eliminated, and the position of slider housing 142 could be mechanically adjusted by the bicyclist via a cable link. This mechanical arrangement could be embodied in a variety of ways and is therefore not shown.

In yet another embodiment, tailored to a bicycle, the transmission input can be supplied as alternating linear rather than rotational strokes.

In this embodiment linkage 137, slider block 136, and pin 135 would be allowed to extend beyond the forward (right) border of enclosure 153. A replacement pedal which substitutes for the original equipment would be mounted directly to pin 135. Forward to rear lateral motion of the pin 135 and thus the replacement pedal would be controlled via a second slider block (not shown) mounted in a slide housing attached directly to the bicycle frame (not shown). This housing would contain a compression spring lodged between the housing and the top of the second slider block. The spring which is compressed during the driving stroke, would function to quickly return the pedal to the upward position during the driving stroke of the alternate pedal.

In such an arrangement the need for the existing pedals (not shown), shaft 131, sprocket 152, sprocket 153, chain 133 and sprocket 134 would be eliminated.

The replacement pedal mounted to pins 135 would then directly drive belt 157 and sprag 163 which is mounted on the right side of the rear tire axle. Similarly, the left replacement pedal would be attached to a matching arrangement which drives a sprag mounted on the left side of the rear tire axle.

In a bicycle application, it may be desirable to separate the left and right drive components into two enclosures similar in cross-section to 153. Each enclosure would be mounted to the right and left side of the frame, respectively, typically aft of the bicycle pedal hub location. Such an arrangement permits the transmission input to be provided as alternating rather than rotational strokes.

It will be understood by those skilled in the art that the foregoing description is by way of example only, and that many additional variations are possible without deviating from the scope of the present invention, which is limited only by the following claims.

What is claimed is:

1. A hardgeared infinitely variable transmission comprising:
    a transmission input shaft, said input shaft providing an input drive in the form of repeated strokes;
    at least one quick return mechanism, each having an input side and an output side, said input side driven at a fixed ratio by said transmission input shaft, said output side of said quick return mechanisms moving at a near constant linear velocity during an advancing portion of said stroke and then returning to its original position before said stroke by a rapid return motion;
    a transmission output shaft;
    conversion means to convert said near constant linear velocity motion of said output side of each of said quick return mechanisms into rotation of said transmission output shaft;
    engagement/disengagement means to engage said output side of each of said quick return mechanisms with said output shaft during said near constant linear velocity portion of said motion of said output side and to disengage said quick return mechanisms from said output shaft during said rapid return motion; and
    input/output speed ratio adjustment means to provide a variable amount of said near constant linear velocity motion of said output side of said quick return mechanism to said conversion means so as to thereby change an input/output speed ratio of said transmission.

2. The transmission of claim 1 further comprising output rotation direction adjustment means to change direction of said rotation of said output shaft relative to said strokes of said input drive.

3. The transmission of claim 1, wherein a plurality of said quick return mechanisms respectively engage said transmission output shaft for proportional portions of said input stroke.

4. The transmission of claim 1 wherein three quick return mechanisms engage said transmission output shaft for portions of alternating 120° periods of said input stroke.

5. A hardgeared infinitely variable transmission comprising:
- a transmission input shaft, said input shaft providing an input drive in the form of repeated strokes;
- at least one quick return mechanism, each having an input side and an output side, said input side driven at a fixed ratio by said transmission input shaft, said output side of said quick return mechanisms moving at a near constant linear velocity for a portion of said stroke and then returning to its original position before said stroke by a rapid return motion;
- a transmission output shaft;
- conversion means to convert said near constant linear velocity motion of said output side of each of said quick return mechanisms into rotation of said transmission output shaft;
- engagement/disengagement means to engage said output side of each of said quick return mechanisms with said output shaft during said near constant linear velocity portion of said motion of said output side and to disengage said quick return mechanisms from said output shaft during said rapid return motion; and
- input/output speed ratio adjustment means to provide a variable amount of said near constant linear velocity motion of said output side of said quick return mechanism to said conversion means so as to thereby change an input/output speed ratio of said transmission;
- wherein said transmission input shaft contains at least one crankarm, each of said crankarms drivingly engaging one of said quick return mechanisms, and wherein each of said quick return mechanisms comprise:
  - a linkage capable of oscillating about a pivot point and having an open interior portion;
  - a slider block to which said crankarm is attached, said slider block suitably disposed within said interior portion of said linkage; and
  - a slider suitably disposed within said interior portion of said linkage such that said slider is free to slide within said interior portion of said linkage.

6. A hardgeared infinitely variable transmission comprising:
- a transmission input shaft, said input shaft providing an input drive in the form of repeated strokes;
- at least one quick return mechanism, each having an input side and an output side, said input side driven by said transmission input shaft, said output side of said quick return mechanisms moving at a near constant linear velocity for a portion of said stroke and then returning to its original position before said stroke by a rapid return motion;
- a transmission output shaft;
- conversion means to convert said near constant linear velocity motion of said output side of each of said quick return mechanisms into rotation of said transmission output shaft;
- engagement/disengagement means to engage said output side of each of said quick return mechanisms with said output shaft during said near constant linear velocity portion of said motion of said output side and to disengage said quick return mechanisms from said output shaft during said rapid return motion; and
- input/output speed ratio adjustment means to provide a variable amount of said near constant linear velocity motion of said output side of said quick return mechanism to said conversion means so as to thereby change an input/output speed ratio of said transmission;
- wherein said transmission input shaft contains at least one crankarm, each of said crankarms drivingly engaging one of said quick return mechanisms, and wherein each of said quick return mechanisms comprise:
  - a linkage capable of oscillating about a pivot point and having an open interior portion;
  - a slider block to which said crankarm is attached, said slider block suitably disposed within said interior portion of said linkage; and
  - a slider suitably disposed within said interior portion of said linkage such that said slider is free to slide within said interior portion of said linkage;
- wherein said conversion means further comprises:
  - at least one linear to rotary conversion input housing, each of said conversion input housings secured to one of said sliders within said interior portion of said quick return mechanisms by a pin, said conversion input housings further containing said engagement/disengagement means;
  - an endless flexible member passing through said conversion input housings, said endless flexible member being engaged and disengaged to said conversion input housings by said engagement/disengagement means;
  - a first interim output shaft;
  - a first sprocket connected to said transmission output shaft;
  - a second interim output shaft; and
  - a second sprocket connected to said second shaft, wherein said endless flexible member simultaneously engages said first and said second sprockets and thereby supplies an output rotation to both said interim output shafts.

7. The transmission of claim 1 wherein said conversion means comprises:
- at least one endless flexible member, each of said flexible members continuously engaged to one of said quick return mechanisms; and
- at least one sprocket connected to said output shaft, each of said sprockets driven by one of said endless flexible members.

8. The transmission of claim 7 wherein said engagement/disengagement means comprises a clutch mechanism controlled by said strokes of said input shaft such that said clutch mechanism alternately engages each of said sprockets with said output shaft during said near constant linear velocity motion of said output side of each of said quick return mechanisms.

9. The transmission of claim 7 wherein said engagement/disengagement means comprises a clutch mechanism controlled by said strokes of said input shaft.

10. The transmission of claim 7 wherein said engagement/disengagement means comprise a sprag incorporated into each of said sprockets of said conversion means such that each of said sprockets engages said output shaft for only said near constant linear velocity motion of said quick return mechanism, and said sprag disengages said sprocket from said output shaft for said rapid return motion.

11. The transmission of claim 6 wherein said engagement/disengagement means comprises friction pads which engage said endless flexible member when said near constant linear velocity motion of said quick return mechanism is faster than motion of said endless member and disengage said endless member when said motion of said quick return mechanism is slower or in the opposite direction of travel than motion of said endless member, such that only the near constant motion is imparted to said output shaft.

12. The transmission of claim 6 wherein said engagement/disengagement means comprises:
a rack secured to said conversion input housing and to said quick return mechanism; and
a spring and damper mechanism, said mechanism selectively engaging or disengaging said quick return mechanism from said endless flexible member depending upon the relative speeds of said endless member and said quick return mechanism.

13. The transmission of claim 6 wherein said engagement/disengagement means comprises:
a rack secured to said conversion input housing and to said quick return mechanism;
a piston secured to said rack;
fluid orifices for applying hydraulic pressure to said piston such that said rack and thereby said quick return mechanism is either engaged or disengaged from said endless flexible member; and
a hydraulic control system driven by said transmission input shaft providing hydraulic pressure to said piston such that said rack and thereby said quick return mechanism engages and disengages said endless member during appropriate portions of each input stroke.

14. The transmission of claim 6 wherein said input/output speed ratio adjustment means comprises:
an adjustment shaft;
a platform connected to said adjustment shaft; and
rollers secured to an upper surface of each of said conversion input housings, said rollers contacting a lower surface of said platform;
wherein said speed ratio is adjusted by moving said shaft and said platform, and thereby moving said conversion housing and said slider within said interior portion of said linkage, such that as said conversion housing and said slider is moved closer to said pivot point about which said linkage oscillates, average linear velocity of said conversion housing decreases, resulting in less rotation of said output shaft for a given input drive, and wherein when said adjustment shaft and said platform move said slider position to coincide with said pivot point, no rotation of said output shaft is produced regardless of input drive, and further wherein as said adjustment shaft and platform move said slider to an opposite side of said pivot point, output shaft rotation direction relative to said input drive is reversed.

15. The transmission of claim 1 wherein each of said quick return mechanism comprises:
a first elliptical gear driven by said transmission input shaft;
a second elliptical gear engaging said first elliptical gear;
a second shaft, said shaft being driven by said second elliptical gear; and
a disk driven by said second shaft, said first and second elliptical gears being arranged such that said disk has a near constant rotational velocity motion for a portion of said input stroke followed by a rapid return motion.

16. The transmission of claim 15 wherein said conversion means comprises:
a slider block secured to each of said disks;
a slider housing having an interior portion within which each of said slider blocks is suitably disposed and free to slide;
a rack secured to each of said slider housings such that movement of said disk produces movement of said slider block, said slider housing and thereby said rack; and
at least one sprocket arranged on said output shaft, each of said sprockets engaging said one of said racks such that movement of said rack produces movement of said output shaft.

17. The transmission of claim 16 wherein said input/output speed ratio adjustment means comprises:
a motor secured to a surface of said disk;
a bearing secured to said surface of said disk;
a threaded shaft driven by said motor and arranged between said motor and said bearing such that said threaded shaft can be rotated about its longitudinal axis by said motor;
a nut free to move on said threaded shaft in response to rotation of said threaded shaft by said motor, said rotation adjusting position of said nut; and
a pin securing said slider block to said nut such that said slider block is secured to said threaded shaft and thereby to said disk;
wherein said speed ratio is adjusted by altering the position of said nut by rotating said threaded shaft using said motor, causing said slider block to move relative to a center of said disk, such that as said slider block moves further from said center of said disk, said lateral movement of said slider housing and said rack increases, producing a greater output speed for a given input drive.

18. The transmission of claim 16 wherein said engagement/disengagement means comprise a sprag incorporated into each of said sprockets of said conversion means such that each of said sprockets engages said output shaft for only said near constant linear velocity motion of said quick return mechanism, and said sprag disengages said sprocket from said output shaft for said rapid return motion.

19. The transmission of claim 16 wherein said engagement/disengagement means comprises:
two additional sprockets, one upper sprocket arranged above said sprocket and a lower sprocket arranged below said sprocket;
interim shafts upon which said upper and lower sprockets are arranged;
means for combining rotation of said interim shafts to produce rotation of said output shaft;
a rack having teeth on both its upper and lower surfaces capable of engaging said upper and said lower sprockets; and
means for raising and lowering said rack such that said output shaft sprocket is engaged for a portion of said motion of said rack in one direction by raising said rack to engage said upper sprocket and said output shaft is also engaged for a portion of said motion of said rack in an opposite direction by lowering said rack.

20. The transmission of claim 18 further comprising output direction adjustment means, said rotation direction adjustment means comprising:
- at least one second output shaft sprocket, each of said second output shaft sprockets engaging one of said racks;
- a second sprag incorporated into said second sprocket such that said second sprocket engages said output shaft for reverse directions, and a first sprag incorporated into a first sprocket engages said output shaft for forward directions; and
- means for substituting said second sprag and said second output shaft sprocket for said first sprag and said first output shaft sprocket when reverse directions are desired.

21. A hardgeared infinitely variable transmission for use in a bicycle having a bicycle frame, a pedal assembly and a front sprocket, said transmission comprising:
- a transmission housing secured to said bicycle frame;
- a transmission input shaft, said transmission input shaft providing an input drive in the form of repeated strokes, each of said strokes comprising a full 360° rotation of said bicycle pedal assembly;
- a first transmission sprocket driven by said input shaft;
- a chain;
- a second transmission sprocket, said chain simultaneously engaging said first and second sprockets, said second sprocket including at least one crankarm;
- at least one quick return mechanism, each of said quick return mechanisms having an input side and an output side, each of said quick return mechanism input sides being driven by one of said crankarms of said second sprocket, such that said output side of said quick return mechanism moves at a near constant linear velocity about a pivot point for a portion of said input drive stroke followed by a rapid return to its position prior to said stroke;
- a transmission output shaft;
- conversion means for converting said motion of said output sides of said quick return mechanisms to a rotational motion of said output shaft;
- engagement/disengagement means to engage each of said quick return mechanisms with said output shaft during said near constant linear velocity portion of said stroke and to disengage each of said quick return mechanisms from said output shaft during said rapid return motion; and
- input/output speed ratio adjustment means to provide a variable amount of said near constant linear velocity motion of said output side of said quick return mechanism to said conversion means so as to thereby change an input/output speed ratio of said transmission.

22. The transmission of claim 21 wherein each of said quick return mechanisms comprise:
- a linkage having an open interior portion on said input side and said output side of said quick return mechanism;
- a slider block disposed within said open interior portion of said linkage on said input side, said slider block being drivingly engaged by said crank arm of said second sprocket, and said slider block being free to move within said interior of said input side of said linkage; and
- a slider disposed within said open interior portion of said linkage on said output side, such that said slider is free to move within and along the length of said interior portion of said linkage, such that motion of said slider about said pivot point varies as a function of its position along the length of said interior portion of said linkage.

23. The transmission of claim 21 wherein said means for converting the motion of each of said quick return mechanisms to output rotational motion comprises:
- a belt;
- a pin, said belt connected to said slider by said pin such that motion of said slider resulting from the motion of said quick return mechanism results in motion of said belt;
- one or more rollers in contact with said belt such that the direction of motion of said belt is suitably directed toward the transmission output shaft of said bicycle; and
- a sprocket secured to said output shaft, said sprocket drivingly engaged by said belt such that motion of said belt engaging said sprocket results in rotational motion of said output shaft.

24. The transmission of claim 21 wherein said conversion means further includes a recoil spring, said recoil spring arranged such that said spring is loaded during said near constant linear portion of said stroke, and such that the unloading of said spring occurs during the rapid return portion of said stroke, thereby causing any slack in said belt to be taken up by winding around said sprocket.

25. The transmission of claim 21 wherein said engagement/disengagement means comprises:
- at least one sprocket engaging said transmission output shaft; and
- a sprag arranged within each sprocket such that said conversion means couples motion of said quick return mechanism during near constant velocity travel and in only one direction to said output shaft, and disengages said quick return mechanism from said output shaft for motion in an opposite direction and for velocities lower than the near constant speed portion of the stroke.

26. The transmission of claim 21 wherein said means for adjusting motion of said quick return mechanism comprises:
- a slider housing having an open interior, said slider housing arranged between said first and second transmission sprocket;
- a second slider block disposed within said slider housing and free to move within said open interior of said slider housing, said second slider block secured to said first slider block by said pin securing said first slider block to said belt, such that position of said first slider block within said open interior of said linkage is dependent upon position of said slider housing in which said second slider block is disposed; and
- means for varying lateral position of said slider housing between said first and second sprockets, and thereby position of said second slider block disposed therein, and thereby position of said first slider block within said open interior of said linkage, such that as position of said first slider block within said linkage relative to said pivot point varies, distance and velocity of travel of said first slider block as a result of motion of said quick return mechanism varies and thereby the force exerted by said first slider block on said belt varies, resulting in a change in said input/output speed ratio.

27. The transmission of claim 26 wherein said means for varying lateral position of said slider housing comprises:
    a rotating shaft engaging said slider housing such that rotating said shaft varies lateral position of said slider housing;
    a gear engaging said rotating shaft;
    a motor driving said gear such that said rotating shaft is rotated; and
    a set of increment/decrement switches mounted on said bicycle frame for controlling said motor drive and thereby lateral position of said slider housing such that said input/output speed ratio is adjusted.

28. The transmission of claim 26 wherein said means for varying the lateral position of said slider housing comprises:
    a cable secured to said slider housing; and
    a shifter connected to said cable and capable of adjusting lateral position of said slider housing by movement of said cable.

29. A hardgeared infinitely variable transmission, said transmission comprising:
    a transmission input mechanism, said transmission input mechanism providing an input drive in the form of repeated strokes;
    at least one quick return mechanism, each of said quick return mechanisms having an input side and an output side, each of said quick return mechanism input sides being driven by said transmission input mechanism at a fixed ratio, such that said output side of said quick return mechanisms moves at a near constant linear velocity about a pivot point during an advancing portion of said input drive stroke followed by a rapid return to its position prior to said stroke;
    a transmission output shaft;
    conversion means for converting said motion of said quick return mechanisms to a rotational motion of said output shaft;
    engagement/disengagement means to engage each of said quick return mechanisms with said output shaft during said near constant linear velocity portion of said stroke and to disengage each of said quick return mechanisms from said output shaft during said rapid return motion; and
    input/output speed ratio adjustment means to provide a variable amount of said near constant linear velocity motion of said output side of said quick return mechanism to said conversion means so as to thereby change an input/output speed ratio of said transmission.

* * * * *